US009477242B2

(12) United States Patent
Kovalcik et al.

(10) Patent No.: US 9,477,242 B2
(45) Date of Patent: Oct. 25, 2016

(54) SYSTEM AND METHOD OF CONTROLLING CONDENSING AND NON-CONDENSING BOILER FIRING RATES

(71) Applicant: Cleaver-Brooks, Inc., Milwaukee, WI (US)

(72) Inventors: William Kovalcik, Shorewood, WI (US); Boris M. Tynkov, Bayside, WI (US); Brian Huibregtse, Mequon, WI (US); John Sutphen, Menomonee Falls, WI (US)

(73) Assignee: Cleaver-Brooks, Inc., Milwaukee, WI (US)

( * ) Notice: Subject to any disclaimer, the term of this patent is extended or adjusted under 35 U.S.C. 154(b) by 589 days.

(21) Appl. No.: 13/655,661

(22) Filed: Oct. 19, 2012

(65) Prior Publication Data

US 2013/0099014 A1    Apr. 25, 2013

Related U.S. Application Data

(60) Provisional application No. 61/550,070, filed on Oct. 21, 2011.

(51) Int. Cl.
*G05D 23/20* (2006.01)
*F24D 12/02* (2006.01)
(Continued)

(52) U.S. Cl.
CPC ............ *G05D 23/1919* (2013.01); *F24D 12/02* (2013.01); *F24D 19/1009* (2013.01); *F24D 3/02* (2013.01); *F24D 2200/046* (2013.01); *Y02B 30/14* (2013.01)

(58) Field of Classification Search
CPC ..................... G05D 23/1919; G05D 23/1927; G05D 23/1902; F24D 12/02; F24D 19/1009; F24D 2200/043; F24D 3/02; F24D 2200/046; F23N 2023/36; F23N 2023/44; F23N 2037/02; F23N 2041/04; Y02B 30/14
USPC ..... 237/8 A, 2 A, 59, 61, 74, 16, 17; 236/14

IPC .... G05D 23/20; F24D 12/02,19/10; F23N 5/02
See application file for complete search history.

(56) References Cited

U.S. PATENT DOCUMENTS 4,403,572 A * 9/1983 Gerstmann et al. ........ 122/20 B
4,502,626 A * 3/1985 Gerstmann et al. ......... 122/44.2
(Continued)

FOREIGN PATENT DOCUMENTS

DE    3820467    12/1989
EP    0445310    9/1991
(Continued)

OTHER PUBLICATIONS

"Optimal Boiler Load Allocation in Distributed Control," Matsko, et al., American Control Conference, p. 1140-1145, 1982.
(Continued)

*Primary Examiner* — Gregory Huson
*Assistant Examiner* — Daniel E Namay
(74) *Attorney, Agent, or Firm* — Husch Blackwell LLP (57) ABSTRACT

Hydronic heating systems, controllers for such systems, and methods of using/operating same are disclosed herein. In one example embodiment, such a system includes at least one condensing boiler and at least one non-condensing boiler, and at least one controller configured for utilizing at least one PID control program to generate at least one signal for controlling firing rates of one or more of the boilers based upon sensed water temperature and temperature setpoint inputs. Depending upon the mode of operation, the at least one PID control program is a first PID control program dedicated to controlling only the at least one condensing boiler, or is a second PID control program dedicated to controlling only the at least one non-condensing boiler, or includes both the first and second PID control programs. Also, outside air temperature serves as a basis for generating the temperature setpoint inputs.

14 Claims, 6 Drawing Sheets

(51) Int. Cl.
*F24D 19/10* (2006.01)
*G05D 23/19* (2006.01)
*F23N 5/02* (2006.01)
*F24D 3/02* (2006.01)

(56) References Cited

U.S. PATENT DOCUMENTS

| | | | |
|---|---|---|---|
| 4,527,246 A | | 7/1985 | Masson |
| 4,534,321 A | | 8/1985 | Rydborn |
| 4,559,785 A | | 12/1985 | Gaines et al. |
| 4,604,991 A | * | 8/1986 | Miller .......................... 126/619 |
| 4,638,767 A | | 1/1987 | George |
| 5,172,654 A | | 12/1992 | Christiansen |
| 5,190,215 A | | 3/1993 | Habermehl, Jr. et al. |
| 5,655,710 A | | 8/1997 | Kayahara et al. |
| 5,775,581 A | * | 7/1998 | Welden ......................... 237/8 R |
| 6,536,678 B2 | | 3/2003 | Pouchak |
| 6,745,085 B2 | | 6/2004 | Pouchak |
| 7,628,122 B2 | | 12/2009 | Min |
| 7,658,335 B2 | | 2/2010 | Johnson, Jr. |
| 7,735,459 B2 | | 6/2010 | Cohen et al. |
| 7,806,346 B2 | | 10/2010 | Mukomilow |
| 7,819,334 B2 | | 10/2010 | Pouchak et al. |
| 2008/0179415 A1 | * | 7/2008 | Johnson ......................... 237/8 A |
| 2008/0179416 A1 | | 7/2008 | Johnson et al. |
| 2010/0006042 A1 | | 1/2010 | Pitonyak et al. |
| 2013/0048745 A1 | | 2/2013 | Johnson, Jr. et al. |

FOREIGN PATENT DOCUMENTS

| | | |
|---|---|---|
| EP | 0898123 | 2/1999 |
| GB | 2161292 | 1/1986 |
| JP | 1256704 | 10/1989 |
| JP | 2017302 | 1/1990 |
| JP | 2044104 | 2/1990 |
| JP | 3036402 | 2/1991 |
| JP | 3036404 | 2/1991 |
| JP | 3050401 | 3/1991 |
| JP | 3110304 | 5/1991 |
| JP | 9042603 | 2/1997 |
| JP | 2002130602 | 5/2002 |
| WO | 02053972 | 7/2002 |
| WO | WO 02053972 A1 * | 7/2002 |
| WO | 2008091970 | 7/2008 |

OTHER PUBLICATIONS

"Automatic control applied to modern high-pressure boilers," Young, Journal of the Institution of Electrical Engineers—Part IIA: Automatic Regulators and Servo Mechanisms, v 94, i 1, p. 66-78, 1947.

U.S. Appl. No. 11/627,739; Non-Final Office Action; United States Patent & Trademark Office; May 13, 2009; 19 pages.

U.S. Appl. No. 11/627,739; Response to Non-Final Office Action; United States Patent & Trademark Office; Aug. 14, 2009; 19 pages.

U.S. Appl. No. 11/627,739; Notice of Allowance; United States Patent & Trademark Office; Sep. 30, 2009; 13 pages.

Go with the Flow . . . The New Wave in Energy Management; Thermodynamic Process Control (TPC); at least as early as Feb. 10, 2010; 4 pages.

The Next Wave of Energy Management . . . Just Got Better!; www.flowintel.com/index.html; printed on Jan. 25, 2013; 5 pages.

CNC Mini-MOD Condensing & Non-Condensing Control; Heat-Timer Corporation; www.heat-timer.com; at least as early as Mar. 9, 2010; 4 pages.

Fidelity (4) MCF (2) FLX; Fidelity Boiler Plant Project—Issued for Bid and Permit; May 19, 2005; 2 pages.

Fulton MODSYNC; Syntex Controls; www.synexcontrols.com/modsync-features.php; Mar. 2012; 8 pages.

Commercial Boiler Systems and Controls; Riverside Hydronics; www.riversidehydronics.com; Mar. 2010; 8 pages.

R7910A SOLA HC (Hydronic Control); Honeywell International Inc.; www.honeywell.com; Dec. 2007; 100 pages.

CB Package Boiler—CB SysteMAX-ISD brochure; Mar. 2008; 8 pages.

CB12-46 June Representative Webinar: Commercial Controls; announcement of Hydronic Systems Control (HSC); Jun. 14, 2012; 1 page.

PowerPoint Presentation regarding Hydronic Systems Control (HSC), Moving forward with the next generation; Cleaver Brooks; Jun. 27, 2012; 44 pages.

TPC-FI-FDP System Specification (Cleaver Brooks); Thermodynamic Process Control; circa 2010; 7 pages.

TPC Wireless Platform Boiler Control—Specifications; Thermodynamic Process Control; Dec. 10, 2007; 8 pages.

ASHRAE Standard, Energy Standard for Buildings Except Low-Rise Residential Buildings, ANSI/ASHRAE/IESNA Standard 90.1-2001, pp. 11, 46, 48-49 and 64.

* cited by examiner

Basic Outdoor Reset
(Condensing Mode)

FIG. 5A

Non-Condensing &
N. C. Assist Modes

FIG. 5B

Non-Condensing
and N.C.
Assist Mode --
Condensing
Reset Shift

SYSTEM AND METHOD OF CONTROLLING CONDENSING AND NON-CONDENSING BOILER FIRING RATES

CROSS-REFERENCE TO RELATED APPLICATIONS

This application claims the benefit of U.S. provisional application No. 61/550,070 filed on Oct. 21, 2011 and entitled "System and Method of Controlling Condensing and Non-Condensing Boiler Firing Rates", the contents of which are incorporated by reference herein.

FIELD OF THE INVENTION

The present invention relates to monitoring and controlling hydronic heating systems. In particular, the invention relates to methods and systems for monitoring and controlling hydronic heating systems comprising both condensing and non-condensing boilers.

BACKGROUND

Traditional steam or more modern hot water boiler systems, commonly known as hydronic heating systems, typically provide heating to large buildings by pumping heated water through a network of pipes. The temperature of the water pumped throughout the building for the most part maintains a desired temperature throughout the building; therefore, it is critical to maintain sufficient water temperatures at different locations of the building. For the most part water loops (e.g. hot water loops) are the primary source of maintaining desired temperature in the building.

Typically, in residential buildings and single-family homes, the hot water loop is as simple as a single pipe that loops water through every radiator in selected parts of a home. In such a system, flow to the individual radiators is not controlled. Whereas in larger and more complex systems, typically found in larger commercial and industrial buildings, a main pipe circulates water uninterrupted around selected parts of such buildings, wherein individual radiators tap off a small portion of the flow in the main pipe. In these systems, individual radiators can be modulated. In addition to modulating the radiators, larger and more complex systems control various conditions of the water entering the main pipe, such as the temperature and the flow of the water entering the main pipe.

Specifically, in controlling temperature of water entering the main pipe of a hot water loop, often such is a matter of controlling firing rate of hot water boilers preceding the main pipe. Such control becomes particularly complex when there are both condensing and non-condensing boilers in the hydronic heating system, especially considering that condensing boilers are known to be favored for warmer outdoor air temperatures and non-condensing boilers are known to be favored for cooler outdoor air temperatures. Needed is a simple manner of enabling systems, which does not trade sufficient operation of hydronic heating systems for simplicity.

SUMMARY

The present disclosure in at least some embodiments concerns an arrangement for controlling a complex hydronic heating system having both condensing and non-condensing boilers that benefits (1) from the particular advantages of each type of boiler, condensing and non-condensing, and (2) from an advantage of controlling separately each type of boiler. In at least some such embodiments, the present disclosure provides the benefits and advantages of a hydronic heating system having at least one condensing boiler and at least one non-condensing boiler, and at least one controller that compares sensed water temperature from a location of the system to a temperature setpoint to control firing rates of each of the boilers.

More specifically, in at least some embodiments, the system controls the firing rates of each type boiler at least through a master controller that runs two PID (proportional-integral-derivative) controller loops, wherein each PID controller loop is dedicated to controlling only one type of boiler (e.g., a condensing PID controller loop for controlling the at least one condensing boiler and a non-condensing PID controller loop for controlling the at least one non-condensing boiler). Additionally, in one embodiment of the system, the master controller communicates with a respective controller of each individual boiler and of a system pump; and where there are multiple boilers of the same type, these boilers are grouped in parallel. As for the groups of boilers of the same type, the condensing boiler group is piped in series with the non-condensing boiler group. This allows the condensing boiler group outlet to supply the non-condensing boiler group inlet.

Additionally, in at least one example embodiment, a hydronic heating system includes at least one condensing boiler, at least one non-condensing boiler, and at least one controller configured to operate to determine, at least indirectly, firing rates for the at least one condensing boiler and the at least one non-condensing boiler. The at least one controller is configured to operate in accordance with a first proportional-integral-derivative (PID) control loop to determine, at least indirectly, a first firing rate for the at least one condensing boiler. Also, the at least one controller is configured to operate in accordance with a second PID control loop to determine, at least indirectly, a second firing rate for the at least one non-condensing boiler.

Further, in at least one example embodiment, a control system for use in controlling operation of a hydronic heating system includes one or more memory devices and one or more control devices connected at least indirectly with the one or more memory devices. The one or more memory devices are configured to store each of a first proportional-integral-derivative (PID) control program, a second PID control program, and first information setting forth a relationship between outside air temperatures and setpoint temperatures. The one or more control devices are configured to operate to determine, at least indirectly, one or more signals configured to govern firing rates for at least one condensing boiler and at least one non-condensing boiler. Additionally, a first of the signals configured to govern a first of the firing rates for the at least one condensing boiler is determined in accordance with the first PID control program, and a second of the signals configured to govern a second of the firing rates for the at least one non-condensing boiler is determined in accordance with the second PID control program. Also, at least one input value for use by one or both of the first and second PID control programs is a setpoint temperature determined based upon the information.

Additionally, in at least one example embodiment, a method for operating a controller of a hydronic heating system having at least one condensing boiler and at least one non-condensing boiler includes receiving an outdoor air temperature value, determining a temperature setpoint value based at least indirectly upon the outdoor air temperature value, and additionally receiving a water temperature value associated with a location within the hydronic heating system. Also, the method includes executing at least one proportional-integral-derivative (PID) control program so as to determine at least one output signal configured for governing at least one firing rate of one or more of the at least one condensing boiler and at least one non-condensing boiler based at least indirectly upon the temperature setpoint value and the water temperature value. Further, if a first condition is satisfied, the at least one PID control program includes a first PID control program dedicated to controlling only the at least one condensing boiler, and if a second condition is satisfied, the at least one PID control program includes a second PID control program dedicated to controlling only the at least one non-condensing boiler. Additionally, if a third condition is satisfied, the at least one PID control program includes both the first and second PID control programs. Finally, the method also includes governing the at least one firing rate of one or more of the at least one condensing boiler and the at least one non-condensing boiler based upon the at least one output signal.

DETAILED DESCRIPTION

A hydronic heating system and method of using such are disclosed herein that provide an arrangement for controlling condensing and non-condensing boiler(s) in a manner that benefits from both (1) advantages of using each type of boiler and (2) advantages of controlling each type of boiler with a separate PID control loop. With respect to the advantages of using each type of boiler, the use of condensing boilers conserves energy if return water temperature is low enough to cause condensing in the boilers or the hydronic heating system. The use of non-condensing boilers have an advantage in that they typically cost less than condensing boilers, and they operate at a similar efficiency as condensing boilers at higher supply temperatures. As for the advantages of controlling each type of boiler with a separate PID control loop, using such a technique is believed to improve performance and flexibility in operating the system. With respect to flexibility in operating the system, having separate PID loops for each type of boiler allows the water temperature of each type of boiler to be maintained at a different temperature.

Although, there are many systems and methods that benefit from the advantages of each type of boiler, the disclosed systems and methods provide a unique and novel approach to benefiting from some of these advantages. Additionally the disclosed systems and methods employ independent PID control loops for each type of boiler, which facilitates the overall system in sufficiently meeting and maintaining a target header (i.e. supply) water temperature.

More particularly, in at least some embodiments, the disclosed hydronic heating system has at least one condensing boiler and at least one non-condensing boiler; at least one sensor to sense water temperature at a location of the hot water loop; and at least one controller that compares the sensed water temperature to a temperature setpoint to control firing rates of each of the boilers. As presented above, in one embodiment, where there are multiple boilers of the same type, these boilers are grouped in parallel; and the firing rate of each group of boilers of the same type are controlled by a master controller that communicates with controllers for each boiler type, and such communication is controlled by separate PID control loops for each type of boiler. Additionally, the outlet of the condensing boiler, or condensing boiler group, feeds the inlet of the non-condensing boiler, or non-condensing boiler group. As mentioned above, the water temperature is sensed by a sensor that is located at an outlet of each boiler, or boiler group, and/or in a return line of a hot water loop.

Regarding the arrangement of the boilers, where the boilers are grouped by type (e.g., a group of all condensing boilers or a group of all non-condensing boilers), in one embodiment, the boilers are sequenced in a lead-lag fashion within their group, and are started according to demand and controlled by unison modulation. For example, in a group of condensing boilers, when the lead condensing boiler's firing rate reaches a predetermined threshold that causes a sensed temperature to exceed the temperature setpoint (entered manually or automatically via sensor) for a period of time, the last boiler in the sequence is turned off. Similarly, if the lead condensing boiler's firing rate reaches a predetermined threshold that causes the sensed temperature to fall below the temperature setpoint for a period of time, the next boiler in the sequence is turned on.

Figure 1:
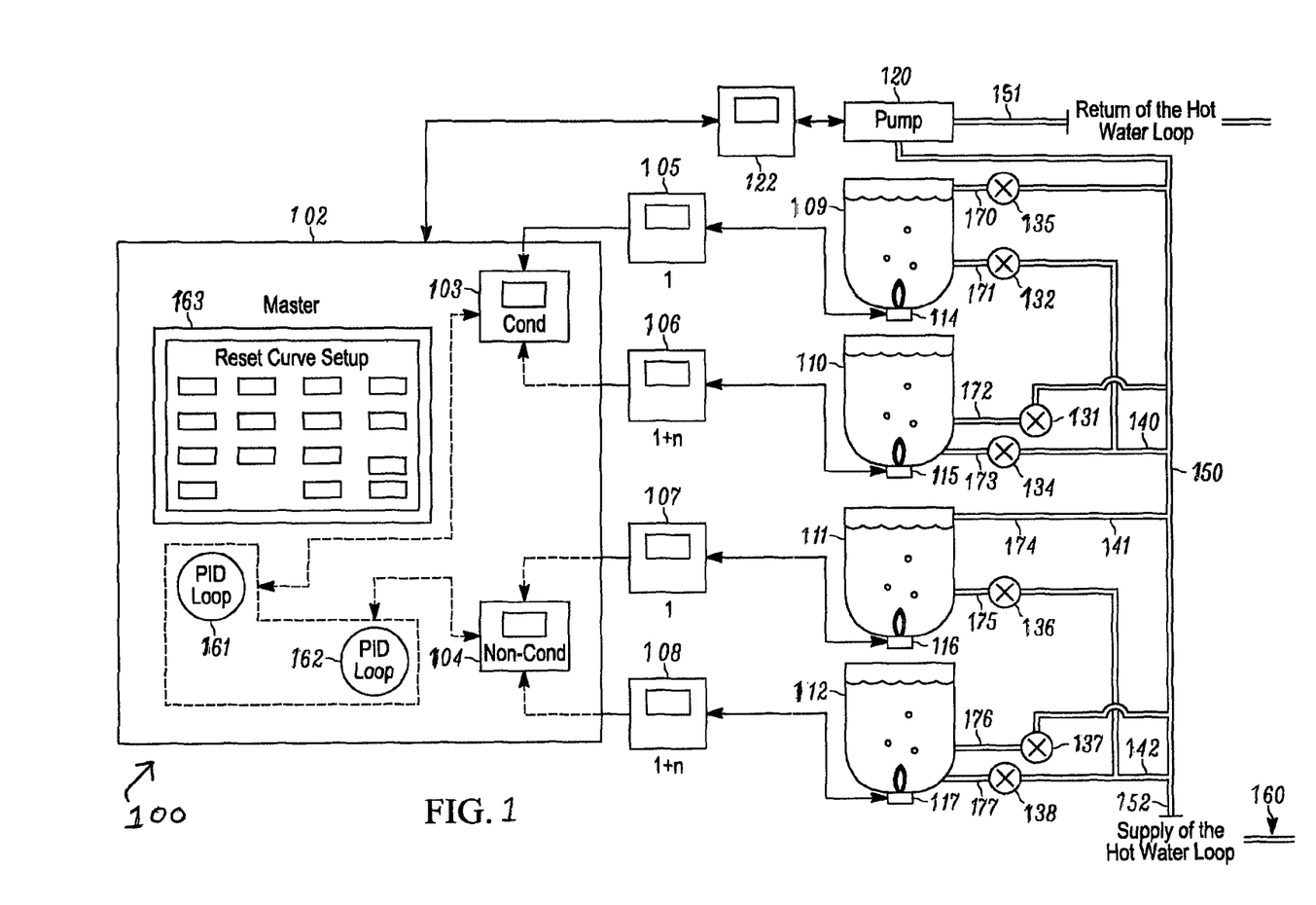
FIG. 1 depicts a block diagram of an exemplary embodiment of the hydronic heating system.
Figure 2:
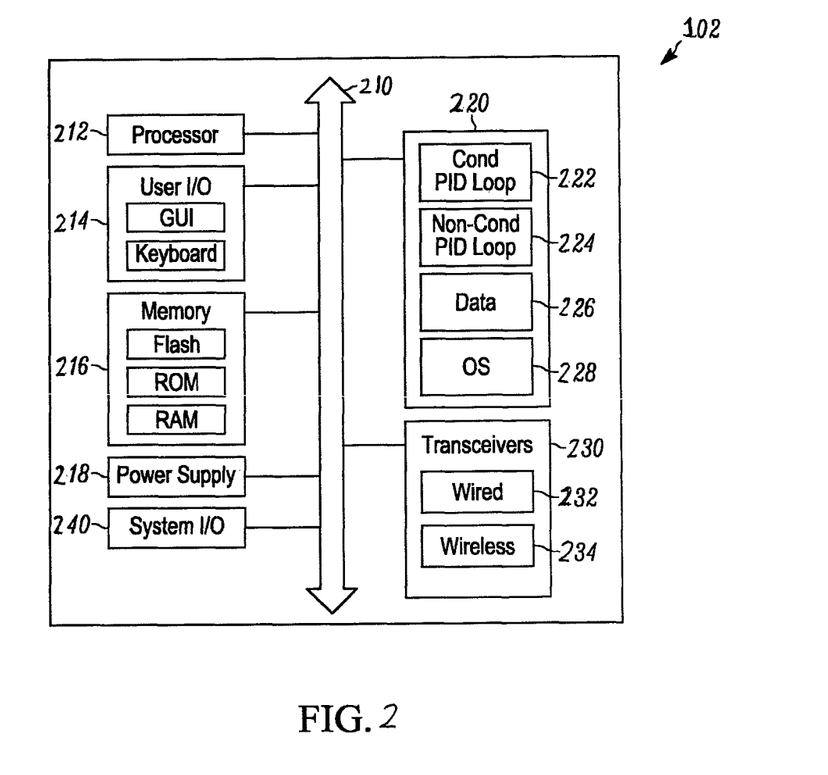
FIG. 2 depicts a block diagram of internal components of an exemplary master controller of the system depicted in FIG. 1.

With respect to FIGS. 1-6, the following paragraphs are more particular descriptions of exemplary elements and steps of exemplary embodiments of the hydronic heating system and methods of such systems. Referring first to FIGS. 1 and 2, exemplary embodiments of a hydronic heating system 100 (depicted in FIG. 1) and components of an exemplary master controller 102 for that system (depicted in more detail in FIG. 2) are shown. Referring more particularly to FIG. 1, the hydronic heating system 100 includes a network of controllers including not only the master controller 102, but also two sub-master controllers 103 and 104, as well as additional controllers 105, 106, 107, 108, and a system pump controller 122 (hereinafter all of these controllers are sometimes collectively referred to as the controllers 102-108 and 122).

All of the controllers 102-108 and 122 are respectively (in general) computers designed specifically for controlling components of the hydronic heating system 100. In the present embodiment, each of the controllers 102-108 and 122 respectively includes at least a microprocessor, one or more input/output components, and circuitry for connecting the microprocessor to the one or more input/output components. Additionally, each of the controllers 102-108 and 122 respectively has some form of memory and permanent storage for storing any of a variety of information and data including, for example, computer instructions constituting an operating system and/or other computer applications to perform the desired functionality of each controller. Further, each of the controllers 102-108 and 122 respectively has an electrical power supply.

Notwithstanding the above discussion, one or more of the controllers 102-108 and 122 can take a variety of other forms. For example, in other embodiments, one or more of the controllers can include another type of processing device, microcontroller, or other control device including, for example, a programmable logic device (PLD). Also, the respective memory/permanent storage associated with a given microprocessor (or other control device) can be implemented in combination with the respective microprocessor or in a manner separate from the respective microprocessor. Example components of the controllers 102-108 and 122, and particularly the master controller 102, are described in further detail in the following paragraphs specifically describing the master controller 102 (e.g., with respect to FIG. 2).

In at least some embodiments, including the embodiment of FIG. 1, the master controller 102 communicates with the system pump controller 122, and the two sub-master controllers 103 and 104. As shown, the sub-master controller 103 particularly is configured for controlling condensing boilers 103, and the sub-master controller 104 particularly is configured for controlling non-condensing boilers. In the present embodiment of FIG. 1, the two sub-master controllers 103 and 104 are integrated with the master controller 102, although in other embodiments this need not be the case but rather the two sub-master controllers can be distinct from the master controller. Further, the master controller 102 also communicates with the additional controllers 105, 106, 107, and 108, each of which controls a respective one of the boilers (discussed further below) of the hydronic heating system 100 of FIG. 1. More particularly, in the present embodiment, the additional controllers 105 and 106 are suited for controlling condensing boilers and are correspondingly in communication with and controlled by the sub-master controller 103, and the additional controllers 107 and 108 are suited for controlling non-condensing boilers and correspondingly are in communication with and controlled by the sub-master controller 104.

Regarding the master controller 102, FIG. 1 illustrates that the master controller 102 has (is programmed with) software including a first PID control loop 161 for controlling the condensing boiler(s) and a second PID control loop 162 for controlling the non-condensing boiler(s). More particularly, in the present embodiment, the first PID control loop 161 software is contained (stored) in the condensing boiler's sub-master controller 103 and the second PID control loop 162 software is contained (stored) in the non-condensing boiler's sub-master controller 104. Additionally, the master controller 102 is also depicted having a graphical user interface 163, which in the present embodiment can he or can include a Reset Curve Setup Screen of FIG. 6.

Further as depicted in FIG. 1, the hydronic heating system 100 in the present embodiment includes four boilers, namely, first and second condensing boilers 109 and 110, respectively, and first and second non-condensing boilers 111 and 112, respectively. Although FIG. 1 depicts two of each type of boiler, alternative embodiments of the hydronic heating system can have any combination of one or more condensing boilers and non-condensing boilers (or any combination of one or more condensing boilers and one or more non-condensing boilers).

As also depicted, each of the respective condensing and non-condensing boilers 109, 110, 111, and 112 is controlled by a respective one of the controllers 105, 106, 107, and 108, respectively. More particularly, each of the respective condensing and non-condensing boilers 109, 110, 111, and 112 includes a respective burner 114, 115, 116, and 117, respectively. As shown, it is the respective burners 114, 115, 116, and 117 of the respective condensing and non-condensing boilers 109, 110, 111, and 112 that particularly are respectively connected to the respective controllers 105, 106, 107, and 108. The respective burners 114 and 115 particularly are coupled to and controlled by the respective controllers 105 and 106, which in turn are coupled to the sub-master controller 103 suited for controlling the condensing boilers. The respective burners 116 and 117 particularly are coupled to and controlled by the respective controllers 107 and 108, which in turn are coupled to the sub-master controller 104 suited for controlling the condensing boilers.

Also, each of the respective condensing and non-condensing boilers 109, 110, 111, and 112 includes a respective inlet pipe 170, 172, 174, and 176, respectively, and further includes a respective outlet pipe 171, 173, 175, and 177. All of the inlet pipes 170, 172, 174, and 176 and outlet pipes 171, 173, 175, and 177 are connected to a main pipe 150 extending between a supply 152 and a return 151. More particularly, in the present embodiment, it should be appreciated that the outlet pipes 171 and 173 of the condensing boilers 109 and 110 are only indirectly coupled to the main pipe 150, insofar as both of those outlet pipes more particularly flow into a sub-main pipe 140 (or sub-main outlet pipe 140) that then is connected to the main pipe 150. Likewise, in the present embodiment, the outlet pipes 175 and 177 of the non-condensing boilers 111 and 112 are only indirectly coupled to the main pipe 150, insofar as both of those outlet pipes more particularly flow into a sub-main pipe 142 (or sub-main outlet pipe 142) that is then connected to the main pipe 150 (also as shown, the inlet pipe 174 of the non-condensing boiler is also labeled with reference numeral 141 for reasons that will become apparent below). Downstream of the main pipe 150, between the main pipe 150 and the return 151, is a system pump 120, the operation of which is governed by the system pump controller 122 coupled thereto. The supply 152 can be considered part of a hot water loop 160.

Additionally as shown, the system 100 includes numerous valves for changing configurations of the hydronic heating system. More particularly, each of the inlet pipes 170, 172, and 176 (but not the inlet pipe 174) has a respective valve 135, 131, and 137 mounted therein (along the length of the inlet pipe) that governs whether water can flow through the respective inlet pipe from a system pump 122 to the respective condensing or non-condensing boiler 109, 110, and 112 associated therewith (water can flow freely via the inlet pipe 174 from the system pump 122 to the non-condensing boiler 111). Also each of the outlet pipes 171, 173, 175, and 177 has a respective valve 132, 134, 136, and 138 mounted therein (along the length of the outlet pipe) that governs whether water can flow back to the system pump 122 (or to a reservoir or outlet for receiving returned water) from the respective condensing or non-condensing boiler 109, 110, 111, and 112. In alternate embodiments, any one or more of the respective valves 132, 134, 136, and 138 can instead be (or in addition include) a respective pump.

Depending upon the embodiment, implementation, or operational circumstance, the valves 131, 132, 134, 135, 136, 137, and 138 can be controlled or operated in a variety of manners and/or to achieve a variety of goals. For example, and as discussed further below, depending on outdoor air temperature the valves can be manually or automatically switched to appropriate configurations so that the hydronic heating system 100 operates in any of three different modes of operation, namely, a condensing mode, a non-condensing mode, and an assist mode. Likewise, in embodiments employing one or more pumps in place of (or in addition to) one or more of the valves such as the valves 132, 134, 136, and 138 as discussed above, the pumps can also be controlled or operated in a variety of manners and/or to achieve a variety of goals, including operation in different modes of operation as discussed above. Further in this regard, it should be noted that the system pump 122 can also be utilized for valve control purposes as well as pump control purposes depending upon the embodiment (also, the pump 120 shown in FIG. 1 can in alternate embodiments be substituted with, or include additionally, a valve).

As will be discussed in further detail below, in the present embodiment and in at least some other embodiments, control operation of the system 100 is performed by one or more of the controllers 102-108, 122 (e.g., the master controller 102 and one or both of the controllers 103 and 104) based upon sensed water temperature information obtained by way one or more water temperature sensors associated with the boilers, pipes, and/or possibly other components of the system 100. Although such water temperature sensors are not expressly shown in FIG. 1, it should be understood that the system 100 includes one or more such water temperature sensors and that such water temperature sensors can in in the present embodiment be considered as embedded within (and therefore be part of) any one or more of the valves, outlets, pipes, or other structures shown in FIG. 1 (for example, any of reference numerals 173, 177, 134, 138, and 151 can be considered as referring additionally to a water temperature sensor embedded in the respective structure shown in FIG. 1). Depending upon the embodiment, numerous various alternative arrangements and/or placements of sensors that sense water temperature are possible. Also depending upon the embodiment, sensors that communicate sensed water temperature to either the master controller 102, the controller dedicated to condensing boilers 103, and/or the controller 104 dedicated to non-condensing boilers (and/or possibly to other ones of the controllers 102-108, 122) can be utilized.

Notwithstanding the particular features of the system 100 shown in FIG. 1, the present disclosure is intended to encompass numerous other embodiments and variations of the system differing from that shown. For example, in some other embodiments, there are possibly radiators throughout the system that are not depicted in FIG. 1.

Depicted in FIG. 2, as previously mentioned, are components of an exemplary embodiment of the master controller 102. The controller 102 in the present embodiment is a computing device specifically configured for controlling boilers of a hydronic heating system, and particularly runs computer software suited for that purpose. As shown, further in the present embodiment, such computer software includes software for operating two proportional-integral-derivative (PID) control loops for each type of boiler of the system 100—specifically, a first PID control loop 222 for the condensing boilers 109, 110 and a second PID control loop 224. Additionally, such computer software includes software for providing an operating system 228 that hosts the PID control loops 222 and 224.

The master controller 102 also includes a processor 212 that is in communication with, via one or more internal communication links (e.g., a bus) 210, a computer readable storage medium. Depending upon the embodiment, the computer readable storage medium is (or can include) any medium that can be used to store information that can later be accessed by the processor 212. In the present embodiment, the computer readable storage medium particularly includes memory 216 and data storage units 220. Memory 216 is preferably a fast-access memory and is used to run program instructions executable by the processor 212. Memory 216 is preferably random access memory (RAM), read only memory (ROM), and/or flash memory.

Data storage units 220 are preferably physical devices and are used to store any data and instructions that may be accessed by the processor 212, such as program data 226 and instructions for the condensing boiler(s) PID control loop 222, the non-condensing boiler(s) PID control loop 224, and the operating system 228 (which hosts at least the two control loops 222 and 224 and possibly other processes or applications as well). Data storage units 220 are preferably an optical medium, a magnetic medium such as a floppy disk, a compact disc (CD), a digital video disk (DVD), and/or a solid-state medium such as state-of-the-art RAM, ROM, and flash memory. In at least some embodiments, the memory 216 and data storage units 220 can be present in a single computer readable storage medium. Also, in some alternate embodiments, it is possible that the computer readable storage medium (or one or more portions thereof) can be formed together with the processor 212, for example, as a processor-in-memory (PIM) device. For purposes of comparing FIGS. 1 and 2, the data storage units 222 and 224 respectively containing the PID control loop software 222 for condensing boilers and the PID control loop software 224 for non-condensing boilers as shown in FIG. 2, respectively, can be considered themselves (or at least when that software is operated on the processor 212) as constituting the controller 103 having the PID control loop software 161 and the controller 104 having the PID control loop software 162 as shown in FIG. 1, respectively.

As shown in FIG. 2, the master controller 102 also includes system input/output components 240 commonly known in the art, and transceivers 230 such as commonly known wired 232 and wireless 234 transceivers. Considering this, and as mentioned above, the controller 102 operates in a networked environment using logical connections to or with at least other hydronic heating system controllers, such as the controllers 103, 104, 105, 106, 107, 108, and 122 depicted in FIG. 1. The master controller 102, other controllers 103, 104, 105, 106, 107, 108, and 122 depicted in FIG. 1, and other computers and communication devices of alternative embodiments of the hydronic heating system can be or include any one or more of a personal computer, a server, a router, a network PC, a peer device, and/or other common network nodes. When used in a local area network (LAN) or wireless local area network (WLAN) networking environment, the master controller 102 is connected to the LAN or WLAN through a network interface or network interfaces (e.g., transceivers) 230, such as the depicted wired and wireless transceivers 232 and 234.

Further as shown in FIG. 2, the controller 102 also includes user input/output devices 214 for providing input to and receiving output from the processor 212, the memory 216, the storage units 220, the network interfaces 230, and other electronic elements of the controller 102. Input devices include various user interfaces such as touch screens, keyboards, keypads, mouse devices, joysticks, microphones, and the like. Output devices include various user interfaces such as monitors for displaying graphical user interfaces, speakers for presenting audio output, and various mechanical devices for providing haptic feedback. Additionally as shown in FIG. 2, the master controller 102 includes a power supply 218 by way of which power is provided to the master controller and internal components thereof Finally, also as shown, the internal communication links (e.g., bus) 210 (and/or other forms of circuitry) interconnect or assist in connecting the various input/output devices 214 and system input/output (I/O) components 240 to the other various electrical elements of the controller 102 such as the processor 212, memory 216, power supply 218, data storage units 220, and network interface 230. Depending upon the embodiment, the various electrical components and circuitry of the controller 102 can be hardware components, software components, firmware components, and/or some combination thereof.

As discussed in further detail below, in at least some embodiments disclosed herein, control over the hydronic heating system 100 as exercised by the controllers 102-108, 122 (and particularly the master controller 102) is based upon one or more comparisons of one or more setpoints and one or more sensed (or calculated) temperature values. The sensed temperature values can be determined in various manners depending upon the embodiment. For example, as discussed above, in the present embodiment the outlet pipes 171, 173 of the condensing boiler(s) 109, 110 are coupled to the sub-main pipe 140. Further, in the present embodiment, the sub-main pipe 140 is coupled to, and feeds water to, the inlet pipe 141 leading to non-condensing boilers 111 (e.g., the inlet pipe 141 is shown to be coupled to the inlet pipe 174 leading to the non-condensing boiler 111). In such an embodiment, the water temperature is sensed by a sensor that is located at an outlet of each boiler (e.g., with sensors being located along each of the outlet pipes 171, 173, 175, and 177) or at the outlets of each of the sub-main pipes for each boiler type (e.g., with sensors being located along each of the sub-main pipe 140 for the condensing boilers 109, 110 and the sub-main pipe 142 for the non-condensing boilers 111, 112 of FIG. 1). Alternatively, the water temperature is sensed by a sensor that is located in a return line (e.g., the pipe 151) of the hot water loop and/or by one (or more) of the sensors that is located in the aforementioned outlets of the boilers.

In cases where the water temperature is sensed from multiple locations, a final temperature for use by the system (e.g., for comparisons with temperature setpoints as discussed further below) can be calculated with respect to, or based upon, the multiple sensed temperatures. Such a calculation can be as simple as taking the average of the sensed temperatures or using the lesser or greater of the sensed temperatures. Also, it is possible for multiple temperatures to be sensed and/or calculated for use in controlling a hydronic heating system such as the system 100. For example, one sensed or calculated temperature can be based upon the water temperature of water exiting the condensing boilers 109, 110, and another sensed or calculated temperature can be based upon the water temperature of water exiting the non-condensing boilers 111, 112.

Regarding the operation of the hydronic heating system, the condensing boilers (e.g., the boilers 109 and 110 of FIG. 1) and non-condensing boilers (e.g., the boilers 111 and 112 of FIG. 1) have different operating characteristics. In the present embodiment, these characteristics can be taken advantage of by either running the condensing or non-condensing boiler(s) separately or in combination. As discussed further below, whether a condensing boiler or boilers, non-condensing boiler or boilers, or a combination of the two or more boilers or groups of boilers is selected is based on an operating or environmental condition, such as outdoor air temperature. The combination of the two types of boilers is used when a type of boiler used is at maximum capacity and an additional boiler(s) of a different type is required to meet demand. Further, where both types of boilers are used, either type may be selected to be a lead boiler(s) based on the operating or environmental condition. As mentioned above, the non-condensing boiler(s) is favored for colder temperatures and the condensing boiler(s) is favored for warmer temperatures.

Considering the aforementioned, in the present embodiment, there are three exemplary modes of operation for the hydronic heating system 100, namely, a condensing mode, a non-condensing mode, and a mode combining both types of boilers (hereinafter referred to as "the assist mode"). In at least some embodiments, whether the hydronic heating system 100 enters the condensing mode or the non-condensing mode is determined based upon the sensed outdoor air temperature. If the outdoor air temperature is sensed to be above a certain threshold temperature, then the master controller 102 controls the hydronic heating system 100 so as to enter into the condensing mode. Alternatively, if the outdoor air temperature is sensed to be below a certain threshold temperature, then the master controller 102 controls the hydronic heating system 100 to enter into the non-condensing mode. Although the threshold temperatures governing whether the hydronic heating system 100 enters the condensing mode and non-condensing mode can be one and the same, in other embodiments, the threshold temperatures can be different from one another.

As for the assist mode, this mode particularly can be invoked when there is insufficient heating capacity being provided simply by the one or more condensing boilers 109, 110 (when operated in the condensing mode) or simply the one or more non-condensing boilers 111, 112 (when operating in the non-condensing mode). That is, the assist mode particularly can be invoked when, during operation in the condensing mode, a sensed water temperature downstream of the condensing boilers 109, 110 (e.g., sensed at the outlet 173 of the condensing boiler 110) is still lower than commanded by the master controller 102 operating in accordance with the first PID control loop 161, or alternatively when, during operation in the non-condensing mode, a sensed water temperature downstream of the non-condensing boilers 111, 112 (e.g., sensed at the outlet 177 of the non-condensing boiler 112) is still lower than commanded by the master controller 102 operating in accordance with the second PID control loop 162. Typically, the assist mode will not be entered from the condensing mode unless all of the available condensing boilers (in this example, both of the condensing boilers 109, 110) are being operated and still cannot provide enough heat. Likewise, typically, the assist mode will not be entered from the non-condensing mode unless all of the available non-condensing boilers (in this example, both of the non-condensing boiler 111, 112) are being operated and still cannot provide enough heat.

When the hydronic heating system is running in condensing mode, the PID control loop 222 dedicated to controlling condensing boilers controls the firing rate of the condensing boiler or boilers 109, 110 in order to maintain satisfactorily the desired temperature (e.g., the temperature setpoint) in the hot water loop 160. As noted, the desired temperature for the hot water loop is related to the outdoor air temperature, and as the outdoor air temperature increases, the temperature setpoint decreases. When the system is running in non-condensing mode, the PID control loop 224 dedicated to controlling non-condensing boilers controls the firing rate of the non-condensing boiler or boilers 111, 112 to maintain satisfactorily the desired temperature in the hot water loop. Similar to the condensing mode, as the outdoor air temperature increases, the temperature setpoint decreases. Additionally, in the non-condensing mode, the temperature setpoint is increased by an offset, which assists in ensuring the return water temperature is warm enough to prevent condensing within a non-condensing boiler.

Finally, when the system is running in the assist mode, the system maintains an independent setpoint for each boiler type. This allows each type of boiler to run at a satisfactory level and as a combination maintain a desired water temperature, wherein each respective PID control loop controls the firing rate of each respective boiler type. Further, in the assist mode, the condensing boiler(s) is operated to maintain a temperature that insures a high enough inlet temperature for the non-condensing boiler(s). This is achieved by the PID control loop of the condensing boiler(s) comparing temperature at the outlet of the condensing boiler(s) to its temperature setpoint.

More particularly regarding the setpoints, the setpoints disclosed herein are temperature setpoints that are target values that the controllers, particularly, the sub-master controllers 103 and 104 of the master controller (operating in accordance with the PID loop software 161, 222, 162, 224), will aim to reach. The target values (i.e., setpoints) particularly are desired water temperatures. From the above, it should be clear that the setpoints to which the sensed temperatures are compared can be different for the PID control loop of the condensing boiler(s) and the PID control loop of the non-condensing boiler(s). Also (alternatively), the setpoints can be a target ranges instead of the target values. Further, insofar as each of the sub-master controllers 103, 104 of the master controller 102 operates based upon the PID control loop software (either the PID control loop software 161, 222, 162, 224) and therefore can be considered a PID controller, it should be appreciated that the operations of these controllers allows for a degree of error. That is, the calculations of each of the PID controllers 103, 104 involve three separate constant parameters all relating to the degree of error in the comparison of the actual and desired water temperature, namely, the proportional (P) parameter depends on the present error, the integral (I) parameter depends on the accumulation of past errors, and the derivative (D) parameter is a prediction of future errors, based on current rate of change of the actual water temperature.

Figure 3:
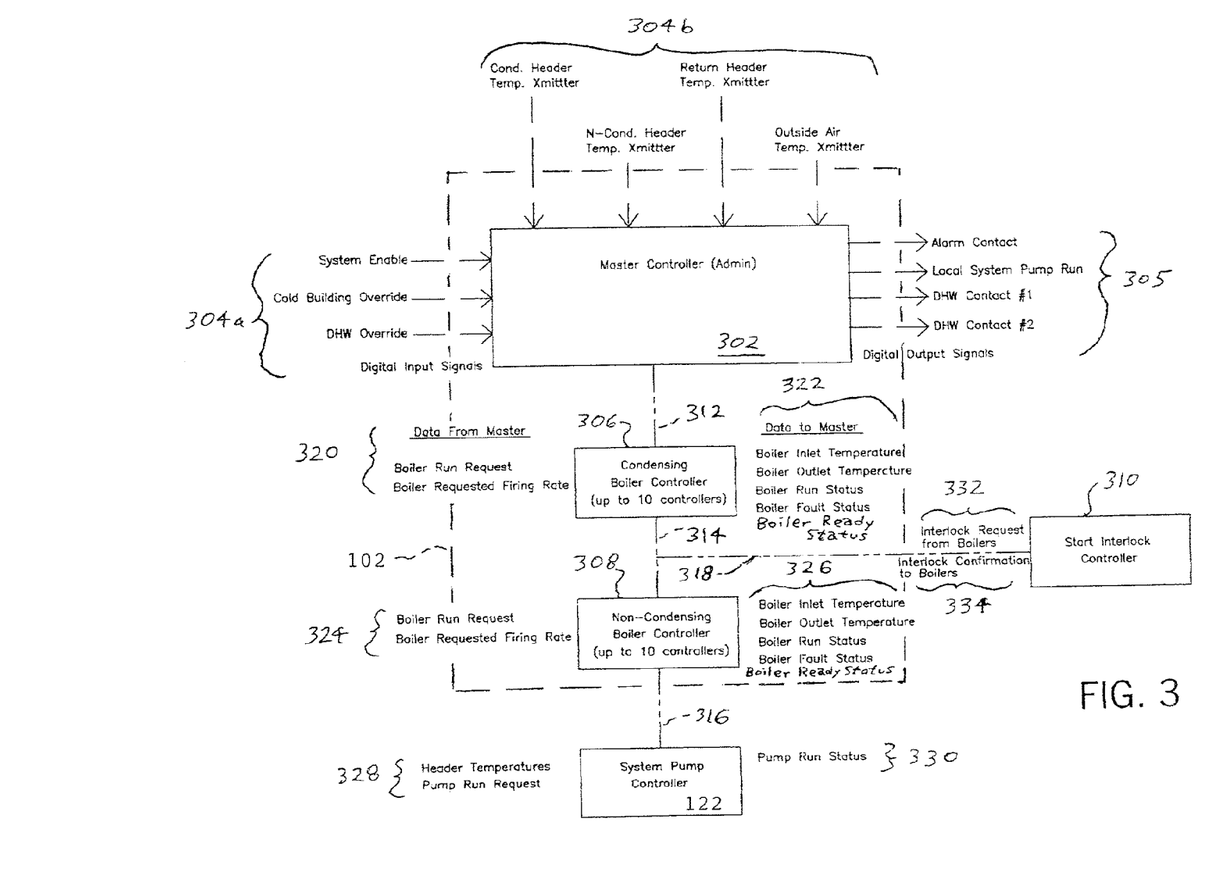
FIG. 3 is a block diagram depicting signals/data that is communicated among an administrative portion of the master controller of FIG. 1 and additional controllers (e.g., two sub-master controllers, a system pump controller, and a start interlock controller) of the hydronic heating system of FIG. 1, in accordance with an example embodiment of the present system.

Turning attention to FIG. 3, aspects of the master controller 102 are shown in more detail, particularly relating to the inputs and outputs utilized and provided by the master controller 102. Again, as was discussed above in relation to FIG. 1, the master controller 102 includes the sub-master controller 103 for condensing boilers, which is shown in FIG. 3 as a condensing boiler controller 306, and the sub-master controller 104 for non-condensing boilers, which is shown in FIG. 3 as a non-condensing boiler controller 308. Although FIG. 3 only shows one of each of the condensing controller 306 and the non-condensing boiler controller 308, as indicated, depending upon the embodiment a larger number of one or both types of controllers can be present (e.g., up to ten of each type of controller). FIG. 3 also shows an administrative portion 302 of the master controller 102 as being distinct from the condensing boiler controller 306 and non-condensing boiler controller 308. Further, FIG. 3 also illustrates intercommunication between the master controller 102 and each of the system pump controller 122, and a start interlock controller 310.

As illustrated, in this exemplary depiction, the administrative portion 302 of the master controller 102 receives a plurality of temperature inputs (or input signals) 304b, namely, a header water temperature input from each of the condensing and non-condensing boilers, a return water temperature input, and an outside air temperature input. These inputs are received from sensors (or transmitters), and typically are analog input signals (e.g., current signals with current varying within a range of 4 to 20 mA). Additionally, the administrative portion 302 also receives a plurality of other system inputs (or input signals) 304a, namely, a system enable input, a cold building override input, and a DHW (Domestic Hot Water) override input, all of which are digital input signals in the present embodiment. Further, the administrative portion 302 of the master controller 102 provides a plurality of outputs (or output signals) 305, namely, an alarm contact output, a local system pump run output, a DHW contact #1 output, and a DHW contact #2 output, all of which are digital output signals in the present embodiment. By virtue of these outputs, messages can be provided to an alarm, the system pump 120, and the condensing and non-condensing boiler(s) 109, 110, 111, 112.

Further as shown in FIG. 3, in the present embodiment, the administrative portion 302 of the master controller 102 is in communication with the condensing boiler controller 306 via a communication link 312, the condensing boiler controller 306 is in communication with the non-condensing boiler controller 308 via a communication link 314, the non-condensing boiler controller 308 is in communication with the system pump controller 122 via a communication link 316, and the communication link 314 additionally is in communication with the start interlock controller 310 via a further communication link 318 (and thus each of the condensing and non-condensing boiler controllers 306 and 308 is in communication with the start interlock controller at least indirectly via the links 318 and 314). Both of the communication links 312 and 314 can be considered part of the internal communication links 210, and the communication links 316 and 318 can be considered to constitute or include one or more of the system I/O components 240 or network interfaces 230.

Although FIG. 3 shows a particular arrangement of connections by way of the communication links 312, 314, 316, and 318, it should be appreciated that the administrative portion 302, condensing boiler controller 306, non-condensing boiler controller 308, system pump controller 310, and start interlock controller 310 can be connected and in communication with one another in numerous different manners other than that shown. For example, rather than having the non-condensing boiler controller 308 coupled to the administrative portion 302 via the condensing boiler controller 306 and both of the communication links 312 and 314, in another embodiment the non-condensing boiler controller 308 can be coupled directly to the administrative portion 302.

Further as illustrated in FIG. 3, each of the condensing boiler controller 306, non-condensing boiler controller 308, system pump controller 310, and start interlock controller 310 receives and provide various signals. The condensing boiler controller 306 particularly receives certain data (or input) signals 320 from the administrative portion 302 (or from the "master" as shown in FIG. 3), namely, boiler run request signals, and boiler requested firing rate signals. Also, the condensing boiler controller 306 sends certain data (or output) signals 322 to the administrative portion 302 (or, again, to the "master" as shown in FIG. 3), namely, boiler inlet temperature signals, boiler outlet temperature signals, boiler run status signals, boiler fault status signals, and boiler ready status signals. Further, the non-condensing boiler controller 308 both receives data (or input) signals 324 from the administrative portion 302 (as is the case with the condensing boiler controller 306, in the present embodiment, these include boiler request run signals and boiler requested firing rate signals) and also sends data (or output) signals 326 to the administrative portion 302 (as is the case with the condensing boiler controller 306, in the present embodiment, these include boiler inlet temperature signals, boiler outlet temperature signals, boiler run status signals, boiler fault status signals, and boiler ready status signals).

Additionally, the system pump controller 122 receives (e.g., from the administrative portion 302) data (input) signals 328 that in the present embodiment include header temperatures signals and pump run request signals, and sends (e.g., to the administrative portion 302) data (output) signals 330, namely, pump run status signals. Also, the start interlock controller 310 receives data signals 332, namely, interlock request signals from boilers, and sends data signals 334, namely, interlock confirmation signals to boilers. Further, although FIG. 3 shows several example types of data/signals that are communicated among various controllers of the hydronic heating system 100, in other embodiments not all of these types of data/signals need be communicated, and/or one or more additional data and/or signals can be communicated in addition to, or instead of, those shown in FIG. 3. Also, in other embodiments, additional data and/or signals can be communicated with respect to other components other than or in addition to those controllers particularly shown in FIG. 3.

Figure 4:
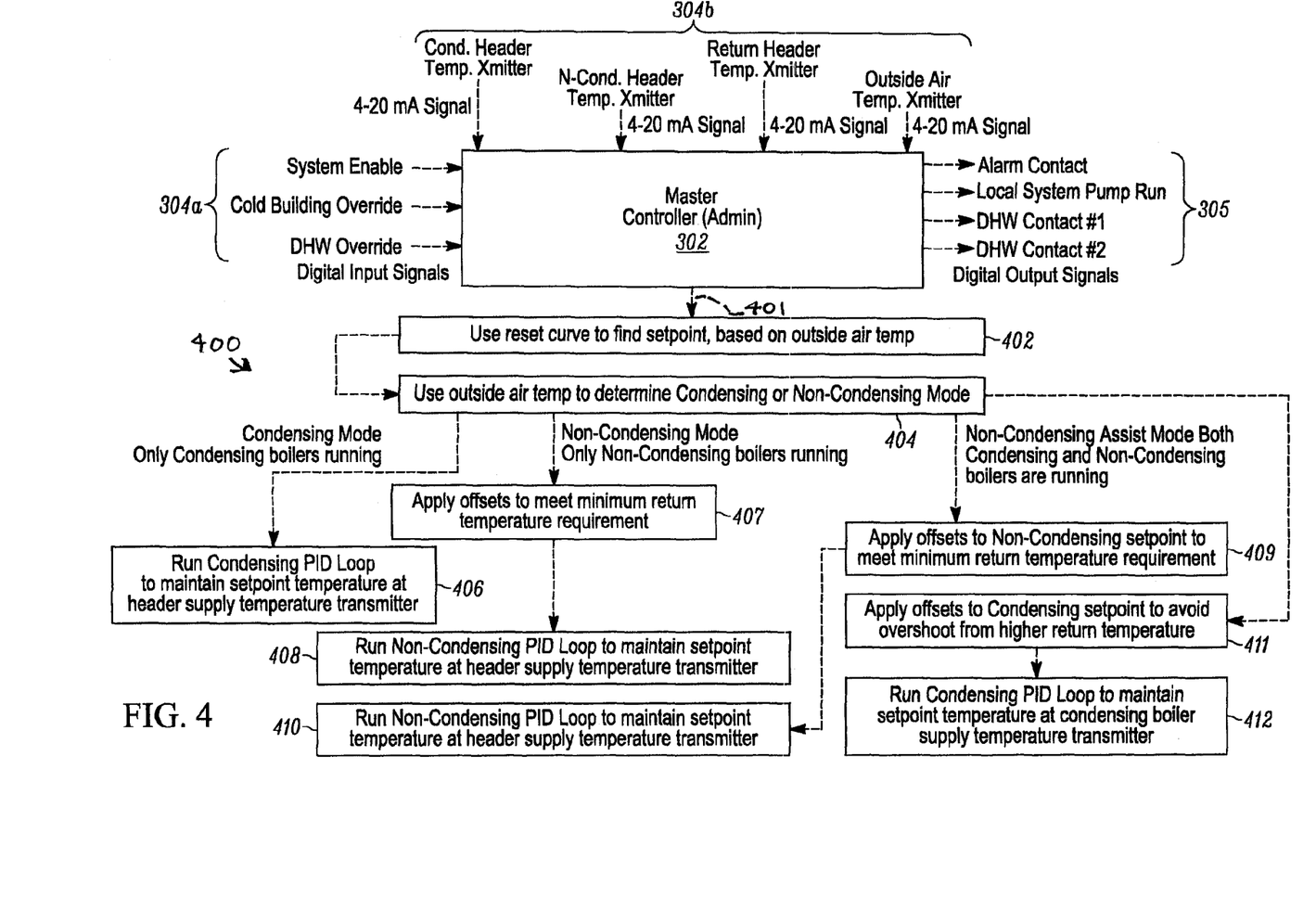
FIG. 4 is a flowchart depicting an exemplary method for operating an embodiment of the present system, particularly a method of operation of the administrative portion of the master controller of FIG. 5, and also further depicts data that is communicated to and from the administrative portion of master controller in one example embodiment.
Figure 5A:
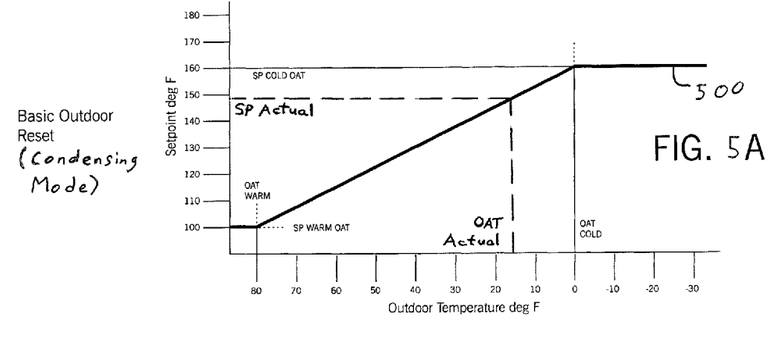
FIGS. 5A, 5B, and 5C respectively depict first, second, and third reset curves, each of which represents a linear relationship between outdoor air temperature (OAT) and a temperature setpoint for one of the PID controller loops, and which is used by the master controller of FIGS. 1-4 to determine one or more temperature setpoints for one or more PID controller loops (e.g., with respect to the outdoor air temperature).
Figure 5B:
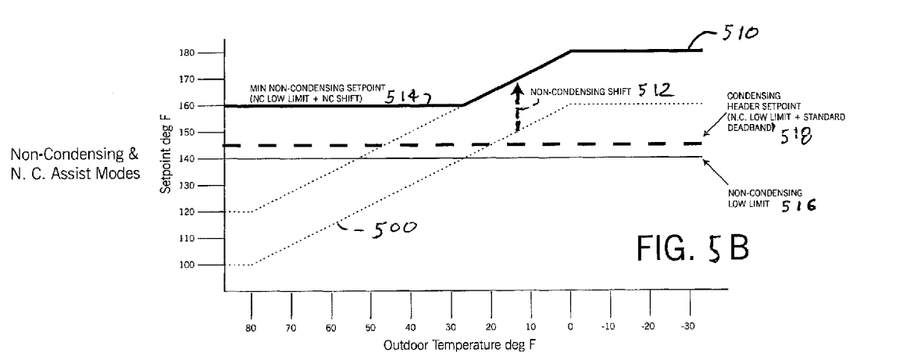
Figure 5C:
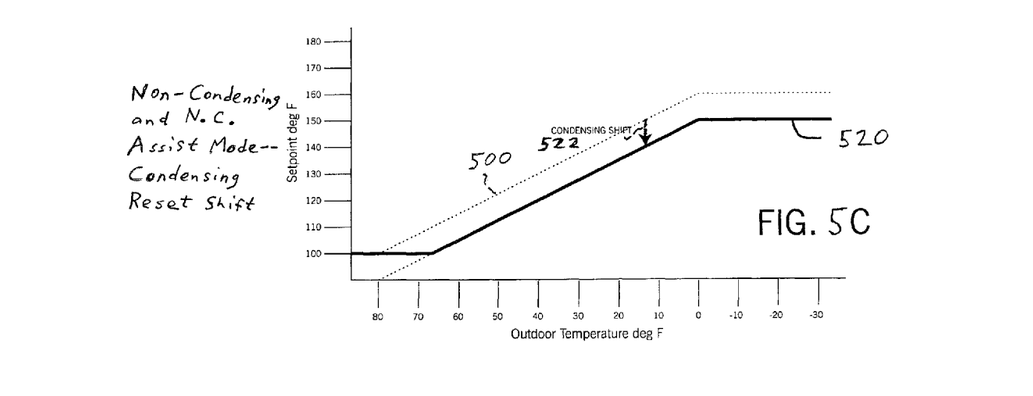
Figure 6:
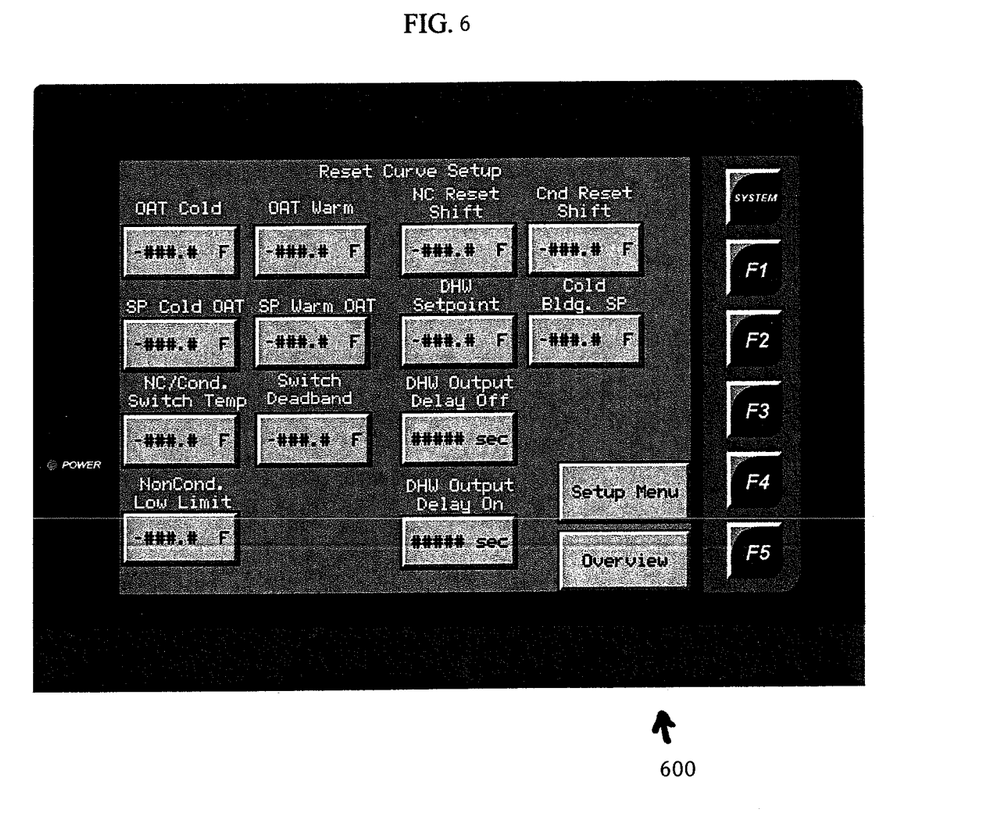
FIG. 6 illustrates an example screen of a graphical user interface (hereinafter referred to as the Reset Curve Setup Screen) that can be provided by the master controller of FIGS. 1-4 in an example embodiment of the present system, and which can be at least used to define a reset curve (such as one of the reset curves depicted by FIGS. 5A-5C).

Turning to FIGS. 4, 5, and 6, a manner of controlling the hydronic heating system 100 by the administrative portion 302 of the master controller 102, and particularly a manner of controlling operation of the condensing boilers 109, 110 and non-condensing boilers 111, 112 of the hydronic heating system 100, is shown in more detail. More particularly, FIG. 4 shows example steps of a process performed by the administrative portion 302 for providing such control. FIGS. 5A, 5B, and 5C show certain example reset curves that are utilized by the administrative portion 302 of the master controller 102 to determine temperature setpoints. FIG. 6 additionally shows an example user interface screen 600, which can be displayed by way of the user I/O components 214 (e.g., one screen among several provided by a graphical user interface).

Referring particularly to FIG. 4, a flowchart 400 illustrates exemplary steps of a process of operation of the administrative portion 302 of the master controller 102 by which the administrative portion exercises control of the boilers. To highlight that his process is performed by the administrative portion 302, the administrative portion 302 of FIG. 3 is again shown in FIG. 4 (along with the temperature inputs 304b, system inputs 304a, and outputs 305), along with an arrow 401 pointing to the flow chart 400. As shown, the process of the flow chart 400 begins at a step 402, at which the administrative portion 302 of the master controller 102 uses a reset curve to find a temperature setpoint, which is based on outdoor air temperature. Example characteristics of such a reset curve are shown in FIGS. 5A-5C, which are discussed in detail below.

Subsequent to the step 402, at a step 404 the outdoor air temperature is used by the administrative portion 302 of the master controller 102 to determine the mode of operating the hydronic heating system 100. As already discussed, in the present embodiment, the hydronic heating system 100 can operate in any of the condensing mode, the non-condensing mode, and the assist (or non-condensing assist) mode of operation. As shown in FIG. 4, if based upon the outdoor air temperature the master controller 102 causes the hydronic heating system 100 to enter into the condensing mode, then at a step 406 the master controller runs the first PID control loop 161 specifically for the condensing boiler(s) 109 and 110, so as to maintain the temperature sensed by the header supply temperature transmitter at its temperature setpoint (setpoint temperature), it being understood that the transmitter transmits approximately the water temperature of the supply header. Accordingly, one or more of the condensing boilers 109, 110 are operated to provide heat in accordance with the first PID control loop 161.

Alternatively, if based upon the outdoor air temperature the master controller 102 causes the hydronic heating system 100 to enter into the non-condensing mode, then at a step 408 the master controller 102 runs the second PID control loop 162 specifically for the non-condensing boiler(s) 111 and 112, so as to maintain the temperature sensed by the header supply temperature transmitter at its temperature setpoint (setpoint temperature). Additionally, in the non-condensing mode the master controller 102 at a step 407 (prior to the step 408) applies an offset to the respective temperature setpoint prior to running the second PID control loop 162 for the non-condensing boilers(s) 111 and 112, so that minimum return temperature requirements are met. Accordingly, one or more of the non-condensing boilers 111, 112 are operated to provide heat in accordance with the second PID control loop 162.

Further, if based upon the outdoor air temperature the master controller 102 causes the hydronic heating system 100 to enter into the non-condensing assist mode (assist mode), in which mode both one or more of the condensing boilers 109, 110 and one or more of the non-condensing boilers 111, 112 are operated to provide heat, then both of the PID control loops 161 and 162 are run independently by the master controller. Accordingly, at a step 412 the first PID control loop 161 for the condensing boiler(s) 109, 110 is run to maintain the temperature setpoint (setpoint temperature) sensed by the condensing boiler supply at its setpoint temperature, and at a step 410 the second PID control loop 162 for the non-condensing boiler(s) 111, 112 is run to maintain the temperature sensed by the header supply at its setpoint temperature. Additionally, in the assist mode, prior to running the second PID control loop 162 for the non-condensing boiler(s) at the step 410, the master controller 102 applies an offset to meet a minimum return temperature requirement at a step 409. Similarly, prior to running the first PID control loop 161 for the condensing boiler(s), the master controller 102 applies an offset to avoid overshoot from a higher return temperature at a step 411.

Referring to FIGS. 5A, 5B, and 5C, respectively, example first, second, and third reset curves 500, 510, and 520 are shown that can be consulted by the administrative portion 302 of the master controller 102 when it controls operation of the hydronic heating system 100 in the manner discussed above with respect to FIG. 4. Each of reset curves 500, 510, and 520 represents the relationship between temperature setpoint and outdoor air temperature (OAT) values. The characteristics of the reset curve that is consulted can vary depending upon the embodiment or circumstance. For example, in at least some embodiments or circumstances, the first reset curve 500 of FIG. 5A is employed, in which the setpoint temperature (SP) decreases as the OAT increases (at least within a range of 80 degrees F. and 0 degrees F. as shown). As shown, the relationship between increasing OAT and decreasing SP is linear in this example, albeit it need not be linear in all cases.

More particularly with respect to the first reset curve 500 of FIG. 5A, the "OAT Cold" value shown represents the coldest outdoor air temperature of the first reset curve, and the "OAT Warm" value shown represents the warmest outdoor air temperature for the first reset curve. These OAT Cold and OAT Warm values effectively define the extent of the variation of the first reset curve 500 along the x-axis of the curve (e.g., these values effectively define the x-axis). By comparison, the "SP Cold OAT" value represents the temperature setpoint to be used when the outside air temperature is at the "OAT Cold" value, and the "SP Warm OAT" value represents the temperature setpoint to be used when the outside air temperature is at the "OAT Warm" value. The "SP Warm OAT" and "SP Cold OAT" values effectively define the extent of the variation of the first reset curve 500 along the y-axis of the curve (e.g., these values effectively make up the y-axis of the curve).

As noted, the first reset curve 500 is only one example reset curve that can be employed in a given embodiment or circumstance. Also, in some embodiments, one reset curve such as the first reset curve 500 can be consulted by the master controller 102 for use in determining the SP when operating in one mode, for example, the condensing mode of operation, but another reset curve or curves can be consulted by the master controller for use in determining the SP or SPs when operating in another mode or modes, for example, the non-condensing mode or the assist mode of operation. Thus, as indicated by FIG. 5A, the first reset curve 500 can be considered a basic outdoor reset curve for use in the condensing mode of operation. By comparison, further for example in this regard, FIG. 5B shows the second reset curve 510 that can be consulted by the master controller 102 when the master controller 102 is operating the hydronic heating system 100 in either of the non-condensing mode of operation or the assist (or non-condensing assist) mode of operation.

Additionally, in other embodiments the second reset curve 510 is not consulted by the master controller 102 during operation in the non-condensing mode or assist mode, but rather the third reset curve 520 of FIG. 5C is utilized during operation in the non-condensing mode or assist mode (or non-condensing assist mode). From FIGS. 5A-5C, therefore, it should be appreciated that in at least some embodiments different reset curves can be used in different modes. Also, in at least some such embodiments, the different reset curves used for different modes can be related to one another—for example, a reset curve for one mode (e.g., non-condensing mode) can be the same or substantially the same as the reset curve for another mode (e.g., condensing mode) except insofar as the one reset curve is a shifted version of the other reset curve, that is, where an active setpoint (or setpoints) is shifted based upon the mode.

Further, where different reset curves are shifted versions of other reset curves, the shift can be either positive or negative depending upon the embodiment. Thus, for example, although the second reset curve 510 of FIG. 2B exhibits a positive shift relative to the first reset curve 500 of FIG. 2A, it could also exhibit a negative shift. Further, for example, although the third reset curve 520 of FIG. 2C exhibits a negative shift relative to the first reset curve 500 of FIG. 2A, it could also exhibit a positive shift. Thus, although a reset shift can be viewed as corresponding to an increasing setpoint, it can also be viewed as corresponding to a decreasing setpoint. In at least some embodiments, a reset shift particularly can correspond to a decrease in setpoint as the condensing boilers are only required to meet the minimum inlet temperature of the non-condensing boilers, rather than the heating setpoint.

The exact characteristics of and/or the manners of calculating, the second reset curve 510 and third reset curve 520 can vary depending upon the embodiment and circumstance. In the present example, it can be noted that the second reset curve 510 differs from the first reset curve 500 in that the second reset curve constitutes a version of the first reset curve that has been shifted upward by a non-condensing shift (or offset) 512 and further modified so that the minimum value of the second reset curve does not fall below a minimum non-condensing setpoint value 514 (in this example, a value of 160 degrees F.), where the minimum non-condensing setpoint value equals the sum of a non-condensing low limit 516 and the non-condensing shift 512. Additionally, FIG. 5B shows a condensing header setpoint 518 (in this example, a value of approximately 140 degrees F.) equaling the sum of the non-condensing low limit 516 and a standard deadband. As for the exemplary third reset curve 520 of FIG. 5C, that reset curve is formed by shifting the first reset curve 500 downward by a condensing shift 522 (or offset).

Referring to FIG. 1, in the present embodiment, the Reset Curve Setup Screen 600 is utilized by a user to define the reset curve or reset curves utilized by the master controller 102, including for example one or more of the first, second, and third reset curves' 500, 510, and 520 of FIGS. 5A, 5B, and 5C, which (as already discussed) can then be used by the master controller 102 determine temperature setpoint(s) for the hydronic heating system 100 (e.g., for a hot water loops such as the hot water loop 160 of FIG. 1). That is, the Reset Curve Setup Screen 600 can be utilized to define the reset curve or reset curves that determine the temperature setpoint(s) that are the setpoint(s) for one or more of the PID control loops (e.g., the PID control loops 161, 222, 162, or 224).

Further as shown in FIG. 6, the Reset Curve Setup Screen 600 includes a plurality of user-actuatable buttons and indicators, particularly indicators that show various values of interest. Among other things, the Reset Curve Setup Screen 600 includes a "NC/Cond Switch Temp" value indicator, which displays a value representing the temperature at which the system will determine the lead group of boilers (condensing or non-condensing) to use. More particularly in this regard, if an outside air temperature is sensed to be higher than the "NC/Cond Switch Temp" value shown by the "NC/Cond Switch Temp" value indicator, the condensing boiler group will be favored as lead (that is, one or more of the condensing boilers 109, 110 will be operated and the non-condensing boilers 111, 112 will not be operated). Alternatively, if an outside air temperature is sensed to be lower than the "NC/Cond Switch Temp" value shown by the "NC/Cond Switch Temp" value indicator, the non-condensing boiler group will be favored as lead (that is, one or more of the non-condensing boilers 111, 112 will be operated and the condensing boilers 109, 110 will not be operated).

Further as shown in FIG. 6, the Reset Curve Setup Screen 600 includes a "Switch Deadband" value indicator, which displays a value representing the temperature offset from the defined switch temperature that must be met when switching between the modes of operation. This value can be used in determining a condensing header setpoint such as the condensing header setpoint 518 of FIG. 5B. Additionally, the Reset Curve Setup Screen 600 includes a "NC Reset Shift" value indicator, which displays a value representing the offset that is applied to the temperature setpoint when running in the non-condensing mode of operation. This value can be used as a non-condensing shift value, such as the non-condensing shift 512 employed in determining the second reset curve 510 of FIG. 5B. Further, the Reset Curve Setup Screen 600 includes a "Cnd. Reset Shift" value indicator, which displays a value representing the offset that is applied to the condensing boiler outlet hot water setpoint when running condensing boilers while non-condensing boilers are also running. This value can be used as a condensing shift value, such as the condensing shift 522 used to determine the third reset curve 520 of FIG. 5C.

Considering the above, the disclosed systems and methods provide many benefits to new and existing commercial building heating applications. Such applications, which by taking advantage of the properties of condensing and non-condensing boilers and the benefits of using separate PID controller loops for controlling each type of boiler can provide sufficient heating at a lower installed cost. Buildings can use the systems and methods to add condensing boilers to existing non-condensing boilers whereby the buildings reap the same benefits as adding new condensing boilers but at a lower cost, since additional condensing boilers do not need to replace the existing condensing boilers.

Specifically, the systems and methods will control boilers to maximize efficiency sufficiently by running condensing boilers when the outside air temperature is warmer and running non-condensing boilers when the outside air temperature is colder. For example, it is believed that condensing boilers should be run at an outdoor air temperature of 20 to 80 degrees Fahrenheit, and non-condensing boiler should be run at −20 to 40 degrees Fahrenheit. Additionally, when there is a lack of a type of boiler the systems and methods will employ the other type of boiler as well, so to maintain sufficient heating for the hot water loop. Moreover, the systems and methods maintain independent setpoints for each boiler plant (i.e. at least one boiler of a particular type, such as condensing or non-condensing type) when both types of boilers are in operation, allowing each boiler plant to run at a sufficient level of operation while maintaining desired water temperature in a header of a hot water loop.

The present disclosure can be contrast with, and is advantageous by comparison with, numerous other control systems. For example, in contrast with the present disclosure, in at least some other control schemes, all running condensing and non-condensing boilers are operated with respect to one setpoint of one control loop. In such other systems, meeting the one temperature setpoint is necessary to prevent the non-condensing boilers from receiving water temperatures that are too low from the return line of the hot water loop. This causes elevated building supply and return water temperatures, which overheats the building and more importantly negatively affects the efficiency of the operating boiler plants. By contrast, in accordance with at least some embodiments encompassed by the present disclosure, by separating control of each type of boiler plant by employing individual PID control loops, such negative effects have been found to be reduced. Additionally, in accordance with at least some embodiments encompassed by the present disclosure, by allowing the condensing boilers to operate at a lower outlet temperature that feeds into an inlet of the non-condensing boilers, condensation occurring in non-condensing units is avoided.

Therefore, the present disclosure is intended to encompass numerous embodiments of improved hydronic heating systems and methods of operation of such systems. In at least one example embodiment, such an improved hydronic heating system includes: at least one condensing boiler and at least one non-condensing boiler; at least one controller configured for comparing sensed water temperature from a location of the system to a temperature setpoint of at least one PID (proportional-integral-derivative) control loop, to control firing rates the boilers; and wherein: due to a first condition, the at least one PID control loop is a first PID controller loop dedicated to controlling only the at least one condensing boiler, due to a second condition, the at least one PID control loop is a second PID controller loop dedicated to controlling only the at least one non-condensing boiler, and due to a third condition, the at least one PID control loop is both the first and second PID controller loops.

Also, in at least one additional example embodiments, such an improved hydronic heating system includes: at least one condensing boiler and at least one non-condensing boiler; at least one controller configured for comparing sensed water temperature from a location of the system to a temperature setpoint of at least one PID (proportional-integral-derivative) control loop, to control firing rates the boilers; and wherein: a first mode of operation, the at least one PID control loop is a first PID controller loop dedicated to controlling only the at least one condensing boiler, a first mode of operation, the at least one PID control loop is a second PID controller loop dedicated to controlling only the at least one non-condensing boiler, and a third mode of operation, the at least one PID control loop is both the first and second PID controller loops.

Furthermore, the present disclosure also includes, in at least one additional embodiment, a method for operating a controller of a hydronic heating system having at least one condensing boiler and at least one non-condensing boiler. The method includes: comparing sensed water temperature from a location of the system to a temperature setpoint of at least one PID (proportional-integral-derivative) control loop of the controller, wherein: due to a first condition, the at least one PID control loop is a first PID controller loop dedicated to controlling only the at least one condensing boiler, due to a second condition, the at least one PID control loop is a second PID controller loop dedicated to controlling only the at least one non-condensing boiler, and due to a third condition, the at least one PID control loop is both the first and second PID controller loops; and controlling firing rates of the at least one condensing boiler and the at least one non-condensing boiler with respect to the comparison.

In reference to the preceding paragraphs and the aforementioned figures, although various embodiments of the present invention have been described above, it should be understood that embodiments have been presented by way of example, and not limitation. A person of ordinary skill in the art will recognize that there are various changes that can be made to the present invention without departing from the spirit and scope of the present invention. Therefore, the invention should not be limited by any of the above-described example embodiments, but should be defined only in accordance with the following claims and equivalents of the claimed invention as presented in this provisional application and following related non-provisional patent applications.

The invention claimed is:

1. A hydronic heating system, comprising:
   at least one condensing boiler;
   at least one non-condensing boiler; and
   at least one controller configured to operate to determine, at least indirectly, first and second firing rates for the at least one condensing boiler and the at least one non-condensing boiler,
   wherein the at least one controller is configured to operate in accordance with a first proportional-integral-derivative (PID) control loop to determine, at least indirectly, the first firing rate for the at least one condensing boiler,
   wherein, the at least one controller is configured to operate in accordance with a second PID control loop to determine, at least indirectly, the second firing rate for the at least one non-condensing boiler,
   wherein the first PID control loop is configured to generate a first output signal that at least indirectly determines the first firing rate, based at least in part upon a first comparison of a first sensed supply header water temperature and a first supply header water temperature setpoint, and
   wherein the second PID control loop is configured to generate a second output signal that at least indirectly determines the second firing rate, based at least in part upon a second comparison of a second sensed supply header water temperature and a second supply header water temperature setpoint.

2. The hydronic heating system of claim 1, wherein the system is configured so that:
   when a first condition is met, the at least one condensing boiler is operated in accordance with the first firing rate and the at least one non-condensing boiler is not operated, and
   when a second condition is met, the at least one non-condensing boiler is operated in accordance with the second firing rate and the at least one condensing boiler is not operated.

3. The hydronic heating system of claim 2, wherein the first condition is that a first sensed outside air temperature exceeds a first temperature threshold, and wherein the second condition is that either the first sensed outside air temperature or a second outside air temperature is less than either the first temperature threshold or a second temperature threshold.

4. The hydronic heating system of claim 2, wherein the system is configured so that:
   when a third condition is met, the at least one condensing boiler is operated in accordance with the first firing rate and the at least one non-condensing boiler is operated in accordance with the second firing rate.

5. The hydronic heating system of claim 4, wherein the third condition is met when (a) either every available one of the at least one condensing boiler is being maximally operated or every available one of the at least one non-condensing boiler is being maximally operated, and additionally (b) the first or second sensed supply header water temperature is below the first or second supply header water temperature setpoint.

6. The hydronic heating system of claim 1, wherein the at least one controller is further configured to receive a first sensed outside air temperature and to determine the first supply header water temperature setpoint as a value corresponding to the first sensed outside air temperature in accordance with a first reset curve.

7. The hydronic heating system of claim 6, further comprising at least one memory device, wherein the first reset curve is stored in the at least one memory device, wherein the first reset curve is representative of a functional relationship between a first plurality of outside air temperature values and a second plurality of temperature setpoints.

8. The hydronic heating system of claim 7, wherein at least a segment of the first reset curve is a linear curve segment according to which, as the outside air temperature values are decreased, the temperature setpoints are increased.

9. The hydronic heating system of claim 7, wherein at least a first portion of the second reset curve is a shifted version of a corresponding portion of the first reset curve, and wherein at least a second portion of the second reset curve is representative of a minimum temperature setpoint value that is maintained over a range of outdoor temperature values.

10. The hydronic heating system of claim 6,
    wherein the at least one controller is further configured to determine the second supply header water temperature setpoint as a value corresponding to the first sensed outside air temperature in accordance with a second reset curve.

11. The hydronic heating system of claim 6, wherein the first reset curve is a shifted version of another base reset curve, such that first active setpoints of the first reset curve are shifted versions of other active setpoints of the other base reset curve.

12. A method for operating a controller of a hydronic heating system having at least one condensing boiler and at least one non-condensing boiler, comprising:
    receiving an outdoor air temperature value;
    determining first and second supply header water temperature setpoints based at least indirectly upon the outdoor air temperature value;
    additionally receiving first and second sensed supply header water temperatures;
    executing a first proportional-integral-derivative (PID) control program so as to determine a first output signal configured for governing a first firing rate of the at least one condensing boiler based at least indirectly upon a first comparison of the first supply header water temperature setpoint and the first sensed supply header water temperature, and a second PID control program so as to determine a second output signal configured for governing a second firing rate of the at least one non-condensing boiler based at least indirectly upon a second comparison of the second supply header water temperature setpoint and the second sensed supply header water temperature,
    wherein if a first condition is satisfied, the first PID control program is executed for controlling only the at least one condensing boiler,
    wherein if a second condition is satisfied, the second PID control program is executed for controlling only the at least one non-condensing boiler, and
    wherein if a third condition is satisfied, both of the first and second PID control programs are executed.

13. The method of claim 12, further comprising:
    determining whether the first condition, second condition, or third condition is satisfied based upon a third comparison of the outdoor air temperature value or another outdoor air temperature value in relation to a threshold.

14. The method of claim 12, further comprising:
providing a reset curve stored in at least one memory device, the reset curve correlating a plurality of outdoor air temperature values including the received outdoor air temperature value with a plurality of temperature setpoint values.

* * * * *

UNITED STATES PATENT AND TRADEMARK OFFICE
CERTIFICATE OF CORRECTION

PATENT NO. : 9,477,242 B2  
APPLICATION NO. : 13/655661  
DATED : October 25, 2016  
INVENTOR(S) : William Kovalcik et al.

Page 1 of 1

It is certified that error appears in the above-identified patent and that said Letters Patent is hereby corrected as shown below:

In the Specification

Column 13, Line 55; Change "SA" to --5A--

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*